United States Patent
Alfano et al.

(10) Patent No.: US 10,577,092 B2
(45) Date of Patent: Mar. 3, 2020

(54) ROTOR HEAD, A ROTOR, AND A ROTORCRAFT

(71) Applicant: AIRBUS HELICOPTERS, Marignane (FR)

(72) Inventors: David Alfano, Aix en Provence (FR); Damien Desvigne, Aix en Provence (FR); Raphael Fukari, Le Rove (FR)

(73) Assignee: AIRBUS HELICOPTERS, Marignane (FR)

( * ) Notice: Subject to any disclaimer, the term of this patent is extended or adjusted under 35 U.S.C. 154(b) by 451 days.

(21) Appl. No.: 15/278,185

(22) Filed: Sep. 28, 2016

(65) Prior Publication Data

US 2017/0088258 A1 Mar. 30, 2017

(30) Foreign Application Priority Data

Sep. 28, 2015 (FR) ...................................... 15 02003

(51) Int. Cl.
| | |
|---|---|
| B64C 27/32 | (2006.01) |
| B64C 7/00 | (2006.01) |
| B64C 11/02 | (2006.01) |
| B64C 27/00 | (2006.01) |
| B64C 27/06 | (2006.01) |

(52) U.S. Cl.
CPC .............. *B64C 27/32* (2013.01); *B64C 7/00* (2013.01); *B64C 11/02* (2013.01); *B64C 27/001* (2013.01); *B64C 27/06* (2013.01); *B64C 2027/003* (2013.01)

(58) Field of Classification Search
CPC ......... B64C 7/00; B64C 27/001; B64C 27/04; B64C 27/06; B64C 27/20; B64C 27/32; B64C 11/02; B64C 11/04; B64C 2027/003
See application file for complete search history.

(56) References Cited

U.S. PATENT DOCUMENTS

| | | | |
|---|---|---|---|
| 3,181,815 A | 5/1965 | Paul et al. | |
| 4,212,588 A * | 7/1980 | Fradenburgh | B64C 7/00 244/17.27 |
| 2005/0226723 A1 | 10/2005 | Sudre et al. | |
| 2009/0304511 A1 * | 12/2009 | Brannon, III | B64C 7/00 416/179 |

FOREIGN PATENT DOCUMENTS

| | | |
|---|---|---|
| DE | 19944412 | 4/2001 |
| EP | 2727832 | 5/2014 |
| FR | 2863583 | 6/2005 |
| FR | 3010973 | 3/2015 |

OTHER PUBLICATIONS

French Search Report for French Application No. FR 1502003, Completed by the French Patent Office, dated Jul. 27, 2016, 6 Pages.

* cited by examiner

*Primary Examiner* — Moshe Wilensky
*Assistant Examiner* — Elton K Wong
(74) *Attorney, Agent, or Firm* — Brooks Kushman P.C.

(57) ABSTRACT

A head for a rotor of a rotorcraft, the head comprising a cap extending radially from an axis of rotation in elevation towards a periphery and extending in azimuth over 360 degrees, the cap extending in thickness between an inside face that is to face a hub of the rotor and an outside face overlying the inside face, the periphery being crenellated to define a succession of crenellations and of notches, each notch allowing a blade of the rotor to perform flapping motion.

20 Claims, 6 Drawing Sheets

Fig.1

(Prior Art)

(Prior Art)

ROTOR HEAD, A ROTOR, AND A ROTORCRAFT

CROSS REFERENCE TO RELATED APPLICATION

This application claims priority to French patent application No. FR 15 02003 filed on Sep. 28, 2015, the disclosure of which is incorporated in its entirety by reference herein.

BACKGROUND OF THE INVENTION (1) Field of the Invention

The present invention relates to a head for a rotorcraft lift rotor, and also to a rotor and to a rotorcraft having such a head.

(2) Description of Related Art

A rotorcraft conventionally comprises an airframe extending from a nose to a tail boom. In general, such a tail boom may also carry rear stabilizing airfoils such as for example a tail fin and stabilizers.

The airframe may carry at least one rotor serving to provide the rotorcraft with at least part of its lift and possibly also with propulsion. Such a rotor is referred to below as a "lift" rotor, and is sometimes referred to as a "main" rotor by the person skilled in the art.

In addition, the tail boom may include rear airfoils, in particular a tail fin possibly carrying a rotor for controlling yaw movement of the rotorcraft and for generating a lateral thrust force serving to compensate the reaction torque created by the main rotor being driven mechanically. Under such circumstances, the rotor is sometimes referred to as a "tail rotor" given its position relative to the rotorcraft, or indeed as an "anti-torque" rotor given its stabilizing function.

The airframe also has covers arranged under the main rotor. These covers may be removable covers for giving access to a power plant, for example. Such covers are conventionally referred to as "engine covers".

While the rotorcraft is flying in translation, air flows along the rotorcraft. The slipstream downstream from the lift rotor and from the covers of the airframe is generally disturbed. Such disturbance can then impact against the rear stabilizing surfaces and also against the tail boom of the rotorcraft.

This disturbed flow is usually referred to as a "wake". Specifically, the wake of an object refers to the zone of fluid that is situated downstream from the object and that presents a modification to its state compared with the flow at infinity.

The impact of disturbances generated by a lift rotor or by the engine covers on the stabilizing airfoils of a rotorcraft can potentially lead to one or more modes of vibration of the tail boom being excited aerodynamically, with such excitation commonly being referred to in the art as "tail-shake". This excitation presents numerous drawbacks, and in particular:

for crew and passenger comfort;
for fatigue in parts and equipment; and
for the operation of certain systems of the rotorcraft.

In addition, the air flow over the airframe can separate from the airframe downstream from the lift rotor, in particular downstream from the engine covers. Such separation tends to generate turbulence and consequently to increase the intensity of the aerodynamic excitation on the stabilizing airfoils, and it also enriches the frequency signature of such excitation.

In order to reduce such excitation, a head may be arranged on the top of the lift rotor, as described in particular in Documents U.S. Pat. No. 3,181,815, EP 2 727 832, FR 3 010 973, and DE 199 44 412.

Thus, a head is generally in the form of a cap forming a substantially ellipsoidal surface of revolution.

Furthermore, notches are arranged in a peripheral ring of the head, in particular to avoid impeding pitch, flapping, and lead/lag motions of the blades.

Under such circumstances, a head may include a cap in the form of an ellipsoidal surface of revolution having one notch for each blade of the rotor.

While flying in translation, the head deflects the flow of air downstream from the lift rotor in a downward direction. This air flow is then deflected mainly towards the covers and the tail boom, and no longer towards the stabilizers and the tail fin of the rotorcraft. The tail-shake effect is thus diminished.

Consequently, a head tends to deflect the slipstream downstream from a lift rotor in a downward direction.

In addition, the head tends to limit separation of a slipstream downstream from the engine covers.

Nevertheless, such heads are not always optimized.

Specifically, a head is generally designed to deflect a slipstream downwards and to minimize said separation of the slipstream downstream from the lift rotor fitted with the head. These lift considerations tend to determine the diameter of the head.

Under such circumstances, the head does not have any means for acting on the frequency signature of the slipstreams that are generated, nor for acting on the forces to which the head is subjected. A manufacturer therefore cannot take action on a head of given shape in order to address problems of interaction between the slipstream and the head.

BRIEF SUMMARY OF THE INVENTION

An object of the present invention is thus to propose an alternative head serving to remedy the above-mentioned drawbacks.

The invention thus provides a head for a rotor of a rotorcraft, the head comprising a cap extending radially from an axis of rotation in elevation towards a periphery and extending in azimuth over 360 degrees, the cap extending in thickness between an inside face that is to face a hub of the rotor and an outside face overlying the inside face. Such a periphery is also crenellated to define a succession of crenellations and of notches, each notch allowing a blade of the rotor to perform flapping motion.

The head is remarkable in that each of the crenellations presents a streamlined profile at least in a section plane perpendicular to the axis of rotation in elevation, the streamlined profile presenting:

varying thickness measured between the inside face and the outside face;
a suction side formed by the outside face and a pressure side formed by the inside face; and
a leading edge that is rounded, having a first radius of curvature, and a trailing edge that is rounded, having a second radius of curvature.

In other words, the crenellations of the head do not have any sharp edges. The suction and pressure sides of the streamlined profile meet at both ends by forming rounded curves. Furthermore, the term "rounded leading edge" or "rounded trailing edge" specify two edges of the streamlined profile that are tangential to circles serving to define a radius of curvature for each of the edges of the streamlined profile of the crenellations of the head. Such an arrangement also serves to reduce the aerodynamic drag coefficient and the wake from such a head.

Advantageously, the section plane may be positioned at half-height of the notches.

Under such circumstances, at least at half-height of the notches, each crenellation presents a streamlined profile. The height of the notches is defined as being the distance measured along the axis of rotation in elevation between the highest point of a notch and the periphery of the cap.

In practice, the crenellations of the cap may be identical to one another.

Thus, the various profiles of each crenellation in different section planes perpendicular to the axis of rotation in elevation are identical to those of the other crenellations in the same section planes perpendicular to the axis of rotation in elevation.

In addition, in the invention, the first radius of curvature of the leading edges of the streamlined profile of the crenellations may be equal to the second radius of curvature of the trailing edges of the streamlined profiles of the crenellations.

In other words, the two rounded shapes joining the suction and pressure sides of a given profile have the same radius of curvature, and in certain circumstances, they may even be identical.

Furthermore, numerous particular shapes may be envisaged for the streamlined profile as a whole for each crenellation in a section plane.

Thus, and in a first profile example, the streamlined profile of the crenellations may be elliptical.

Such a profile of elliptical shape is thus symmetrical relative to two perpendicular axes of the ellipse, known respectively as the "major" axis and as the "minor" axis, the major axis coinciding with the chord of the streamlined profile. In other words, in such circumstances, the suction side and the pressure side are symmetrical relative to the chord of the streamlined profile.

In a second profile example, the streamlined profile of the crenellations may be asymmetrical.

Under such circumstances, such a profile does not possess an axial axis of symmetry. The suction and pressure sides describe curves that are different from each other.

Advantageously, the streamlined profile of each the crenellations may present relative thickness lying in the range 10% to 30%.

In the field of aviation, it is common practice to use the term "relative thickness" of a profile to designate the ratio between the maximum thickness of the profile, i.e. the maximum distance between the suction side and the pressure side, and the chord of the profile, which is defined as being the distance between the leading edge and the trailing edge of the profile. Such a relative thickness lying in the range 10% to 30% thus corresponds to a profile that is "thick".

In practice, in the section plane perpendicular to the axis of rotation in elevation, the chord of the streamlined profile of the crenellations may be inclined at an angle $\alpha$ relative to the tangent at the periphery, which angle $\alpha$ may lie in the range $-30°$ to $+30°$.

In other words, when the angle $\alpha$, also referred to as the angle of incidence, is zero, the chord of each streamlined profile is parallel to the tangent at the periphery. Furthermore, when the angle $\alpha$ is not zero, it may vary from one crenellation profile to another in a given section plane or indeed along a given crenellation in different section planes defining different profiles for that crenellation.

In a first variant cap, each crenellation may have a plane bottom face arranged at its periphery, this plane face extending perpendicularly relative to the axis of rotation in elevation.

Advantageously, these plane bottom faces of the various crenellations may also be coplanar with one another so as to define a bottom plane of the cap connecting together the inside and outside faces of this first cap variant.

In a second cap variant, each crenellation may have a rounded bottom face arranged at its periphery.

Thus, these rounded faces may define toroidal portions connecting together the inside and outside faces of this second cap variant.

In addition to a head, the invention also provides a rotorcraft rotor having means carrying a plurality of blades. The rotor then has a head of the above-described type.

In addition, the invention provides a rotorcraft having at least one rotor of this type.

BRIEF DESCRIPTION OF THE SEVERAL VIEWS OF THE DRAWINGS

The invention and its advantages appear in greater detail in the context of the following description of examples given by way of illustration with reference to the accompanying figures, in which.

DETAILED DESCRIPTION OF THE INVENTION

Elements shown in more than one of the figures are given the same references in each of them.

Three mutually orthogonal directions X, Y, and Z are shown in some of the figures, which directions are stationary relative to the rotorcraft in order to define a reference frame specific to the rotorcraft.

The direction X is said to be longitudinal and extends from the nose towards the tail boom of the rotorcraft. Another direction Y is said to be transverse. Finally, a third direction Z is said to be in elevation and it is substantially vertical when the rotorcraft is standing on a horizontal support.

Figure 1:
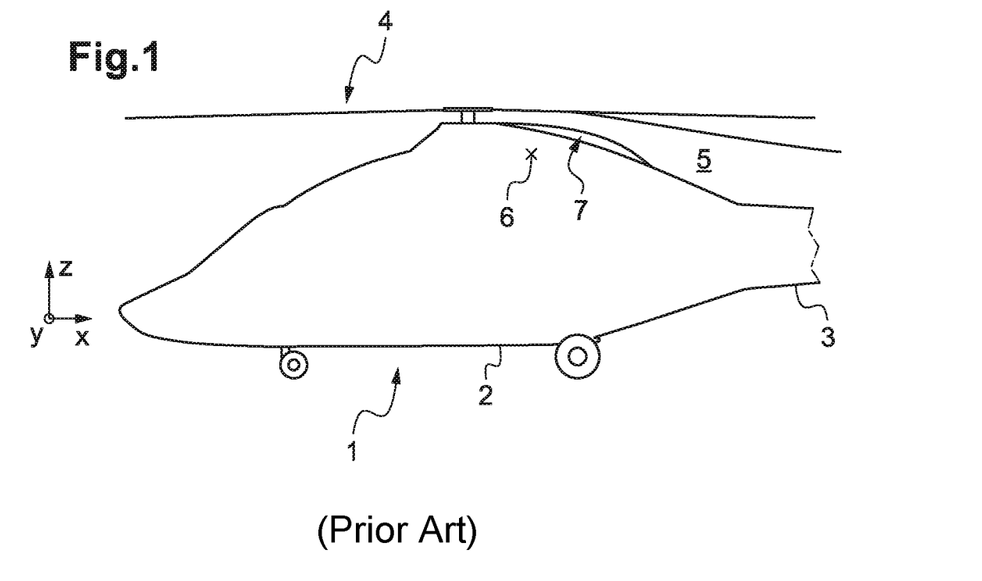
FIG. 1 is a side view of a prior art rotorcraft without a head.

FIG. 1 shows a prior art rotorcraft illustrating the problem of the invention.

The rotorcraft 1 is conventionally provided with an airframe extending from a nose to a tail boom 3. The tail boom 3 may carry a tail fin, stabilizers, and possibly a tail rotor.

The airframe carries at least one main rotor 4 that provides the rotorcraft with at least part of its lift and possibly also with propulsion.

The wake 5 generated by the high portions of the rotorcraft and in particular by the flow of air produced by the rotor 4 impacts the tail boom of the aircraft, and in particular the tail fin and the stabilizers.

Furthermore, the wake 5 tends to separate from the airframe in a separation zone 7 situated close to the engine covers 6.

Figure 2:
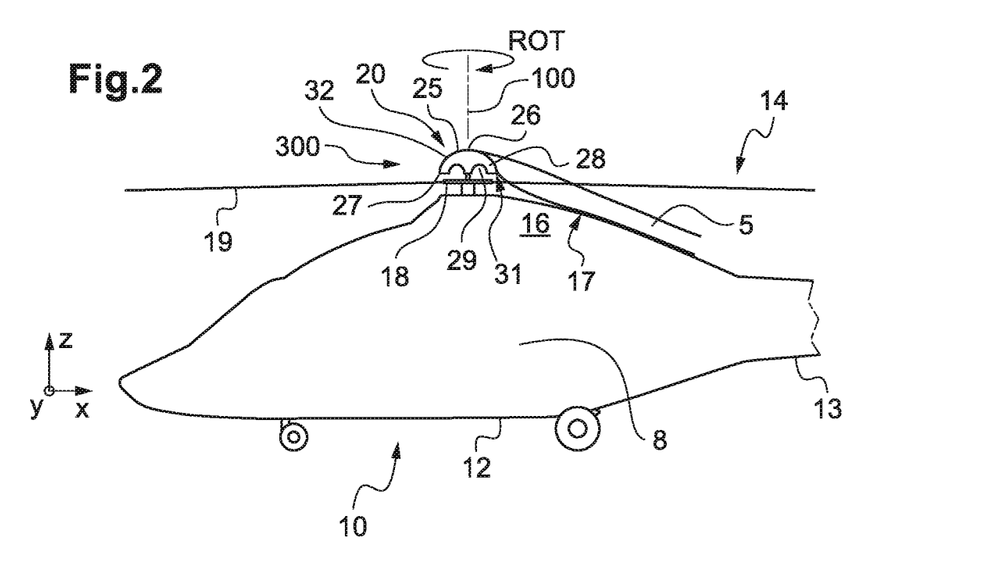
FIG. 2 is a side view of a rotorcraft of the invention.

FIG. 2 shows a rotorcraft 10 of the invention.

The rotorcraft 10 has an airframe 8 extending from a nose to a tail boom 13. The airframe 8 carries at least one main rotor providing the rotorcraft with at least part of its lift and possibly also propulsion. The rotor 14 then has a hub 18 carrying a plurality of blades 19.

Furthermore, the rotor 14 includes a head 20 of the invention.

The head 20 is thus provided with a cap 25, e.g. a spherical cap. By way of example, the cap 25 is fastened to the hub 18 in order to be constrained to rotate with the main rotor 14.

The cap 25 extends radially from an axis of rotation 100 in elevation towards a periphery 27. Thus, when the cap 25 is constrained to rotate with the main rotor 14, the axis of rotation 100 in elevation coincides with the axis of rotation of the main rotor 14 and is close to the elevation direction Z.

The cap 25 also extends in azimuth over 360 degrees. The cap 25 also extends in elevation in a thickness direction from an inside face 31 facing the hub 18 towards an outside face 32. The center of each face is then arranged on the axis of rotation 100 in elevation.

Furthermore, the cap 25 has a crenellated shape defining a succession of crenellations 28 and of notches 29, each notch 29 making it possible for a blade 19 of the rotor 14 to perform flapping motion, lead/lag motion, and possibly also pitch motion.

The wake 5 generated by the high portions of the rotorcraft is then deflected downwards by the head 20.

During rotation of the cap 25, an incident air stream 300 impacts in succession against a solid surface of a crenellation 28 and an opening of a notch 29. The incident air stream 300 can then impact directly against the outside face 32 of the cap 25 over a crenellation 28 or it can pass through a notch 29 into the inside of the cap 25 prior to impacting against the inside face 31 of the cap 25, e.g. belonging to a crenellation 28. The term "stream of air impacting a notch" or any equivalent expression means that the air stream is heading towards a notch and penetrates into the opening formed by the notch. Conversely, away from the notches, the air stream impacts against the solid surface of the inside face and/or the outside face of a crenellation.

Figure 3:
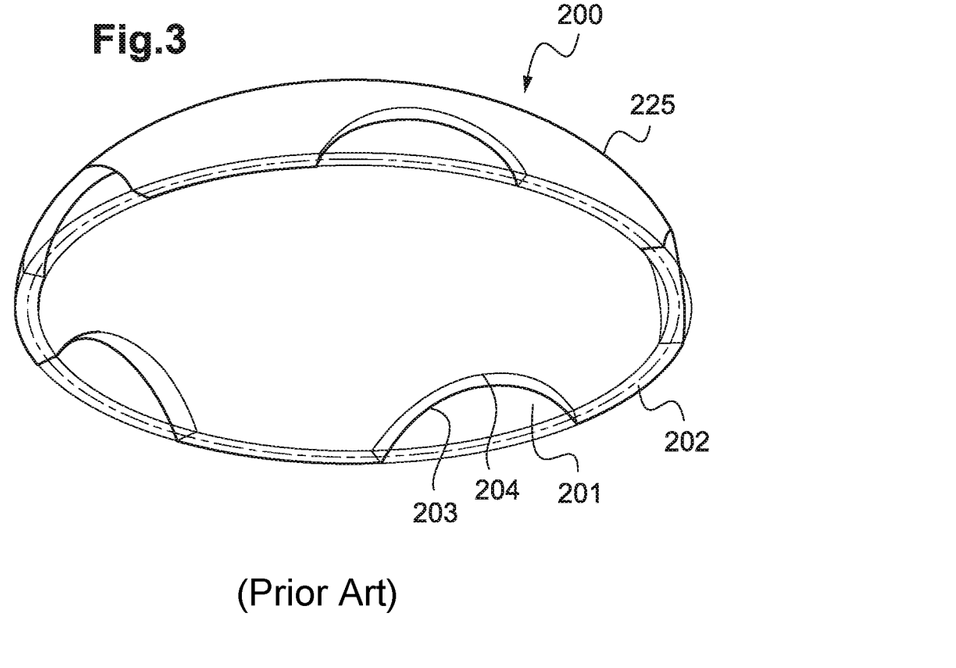
FIG. 3 is a perspective view of a prior art head.

As shown in FIG. 3, the prior art head 200 also has a cap 225 of crenellated shape with a succession of crenellations 202 and of notches 201 making it possible for the blades 19 of the rotor 14 to perform flapping motion.

Nevertheless, with that configuration, each crenellation 202 is of thickness that is constant in a section plane perpendicular to the axis of rotation 100 in elevation. There are thus sharp edges 203, 204 at the intersections between firstly cylindrical or conical cutouts used for forming the notches 201 and secondly the inside and outside faces of the cap 225.

This particular shape for the crenellations 202 is thus not optimum for limiting the aerodynamic drag coefficient and the wake from such a head 200. Specifically, at least at the sharp edges 203, 204, the air stream is subjected to intense separation phenomena, thereby increasing the aerodynamic drag coefficient and the wake from the head 200.

Figure 4:
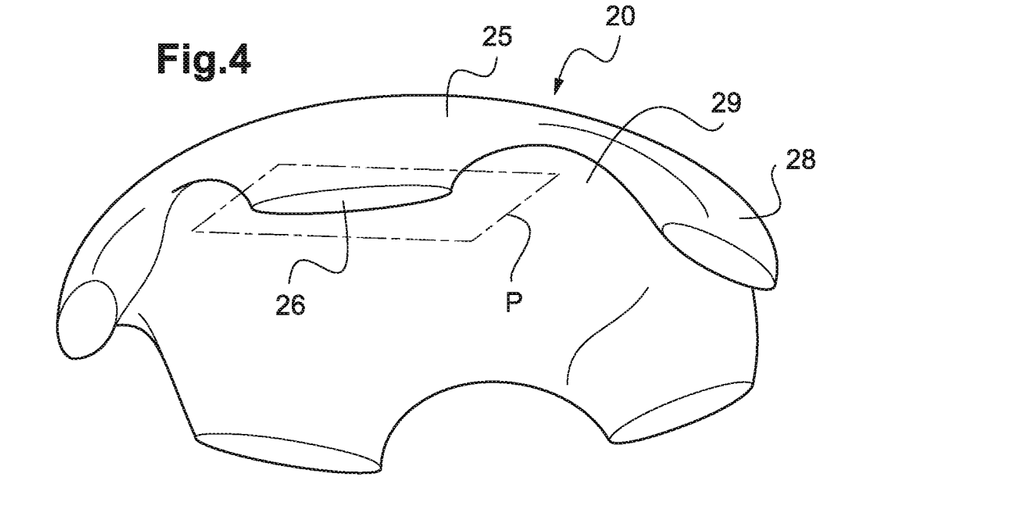
FIG. 4 is a perspective view of a head in a first embodiment having elliptical aerodynamic profiles oriented with an angle of incidence $\alpha$ that is zero.

As shown in FIG. 4, and in a first embodiment, the head 20 comprises a cap 25 with crenellations 28 presenting a shape of streamlined profile 26, at least in a plane P perpendicular to the axis of rotation 100 in elevation. Such a plane P is advantageously arranged at half-height of the notches 29.

In practice, the streamlined profile 26 of the crenellations 28 is said to be a "thick" profile since it presents relative thickness lying in the range 10% to 30%.

The special shape of the crenellations 28 and of the notches 29 thus makes it possible to generate a pulsating wake that interacts with the wake generated by the cap 25. The overall wake generated by the head 20 potentially leads to a reduction in the overall intensity of the dynamic behavior of the wake 5 and tends at least to limit the separation of the wake 5 in the separation zone 17 situated in the proximity of the engine covers 16.

Figure 5:
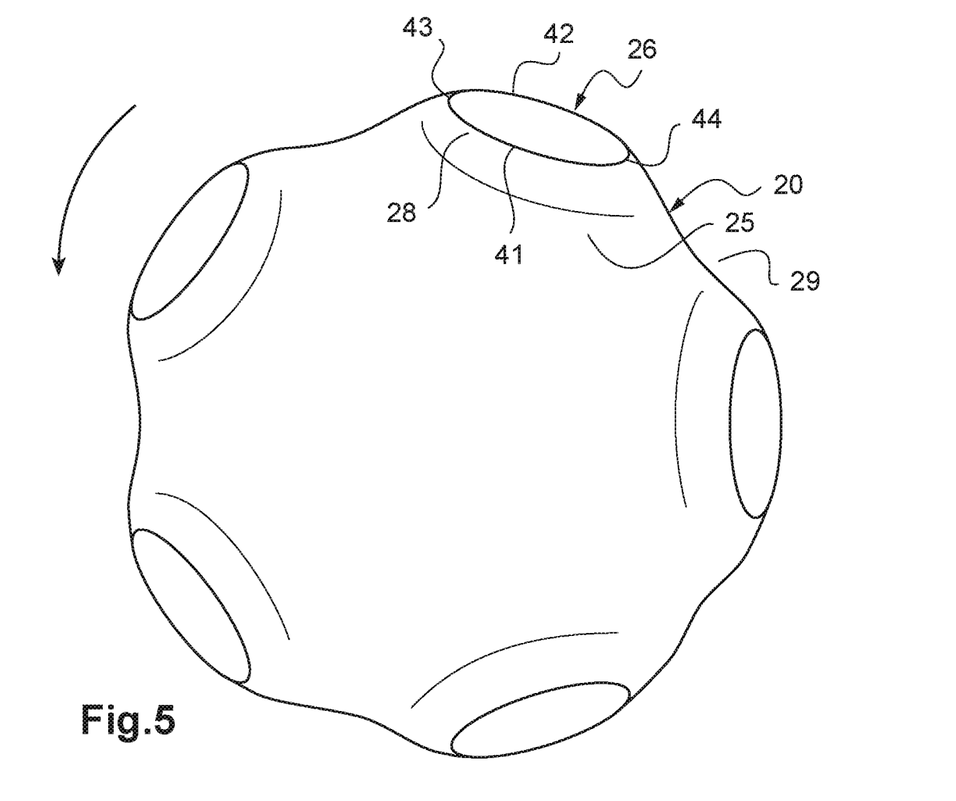
FIGS. 5 and 6 are views of the FIG. 4 head from beneath.

As shown in FIG. 5, such a profile 26 for a crenellation 28 is of varying thickness, with a suction side 42 formed by the outside face 32 of the cap 25 and a pressure side 41 formed by the inside face 31 of the cap 25. The profile 26 also has a leading edge 43 that is rounded and a trailing edge 44 that is likewise rounded.

As shown, the leading and trailing edges 43 and 44 may have the same radius of curvature. Furthermore, the general shape of the profile 26 may be of various different shapes. Thus, as shown in FIGS. 4 to 8 in a first crenellation profile example, the streamlined profile may be an ellipse having a major axis coinciding with the chord of the streamlined profile. Under such circumstances, the leading edge 43 and the trailing edge 44 are symmetrical relative to the minor axis of the ellipse.

Figure 6:
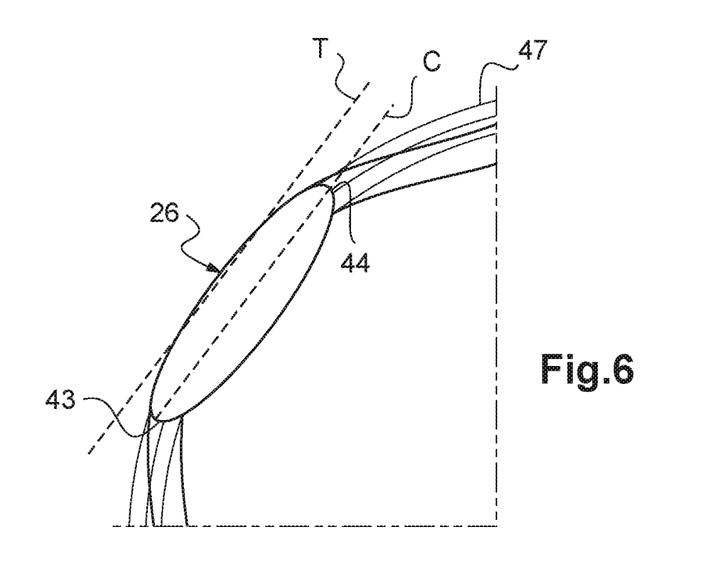

As shown in FIG. 6, the chord C of the profile 26 is defined as being the straight line passing through the leading edge 43 and the trailing edge 44. As shown in FIGS. 4 to 6, in the first embodiment, such a chord C may extend parallel to a tangent T to a circumference 47 formed by the intersection between the outside face 32 and the section plane P.

In this first embodiment, the angle of incidence α between these two directions is thus zero, whereas in other embodiments, such an angle α may equally well lie in the range −30° to +30°.

Figure 7:
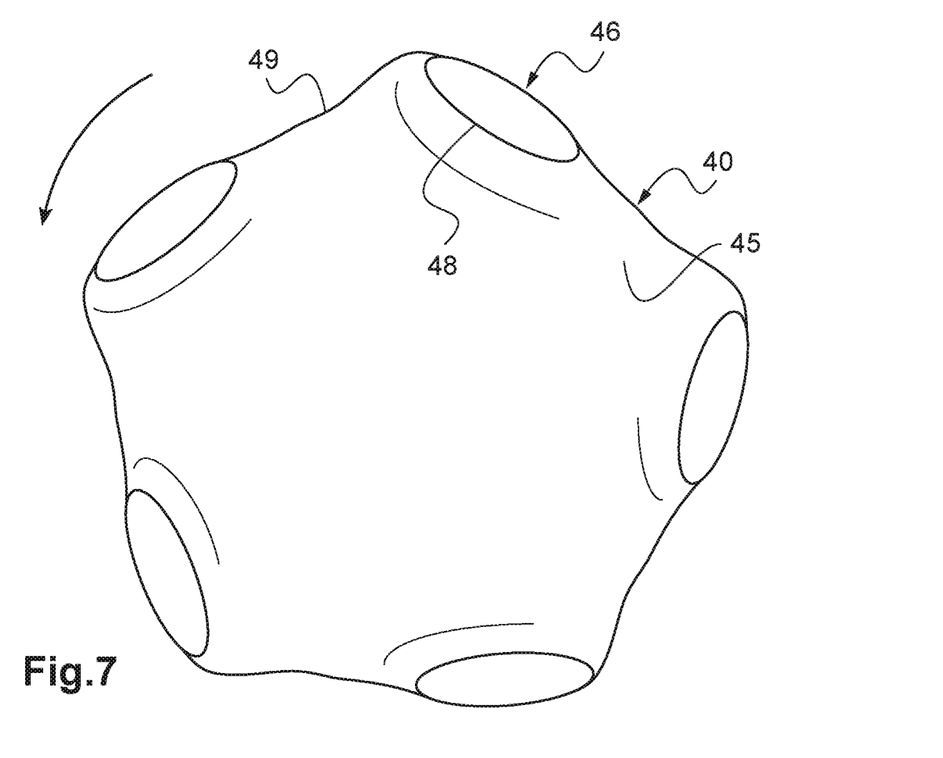
FIGS. 7 and 8 are views from beneath of a head in a second embodiment having elliptical aerodynamic profiles oriented with an angle of incidence $\alpha$ that is not zero.
Figure 8:
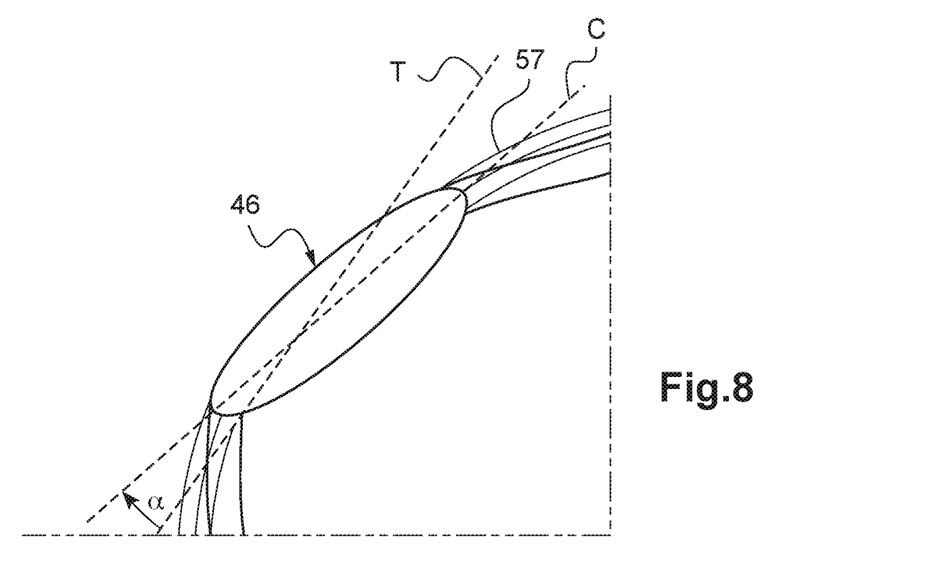

Thus, in a second embodiment, as shown in FIGS. 7 and 8, the angle of incidence α of a profile 46 may for example be equal to +15°. As shown in FIG. 7, the head 40 then has a crenellated cap 45 defining a succession of crenellations 48 and of notches 49. The various profiles 46 of the crenellations 48 may then advantageously all present the same angle of incidence α.

As shown in FIG. 8, the angle of incidence α is an angle oriented in a clockwise direction between a chord C of the profile 46 and a tangent T to the circumference 57.

Figure 9:
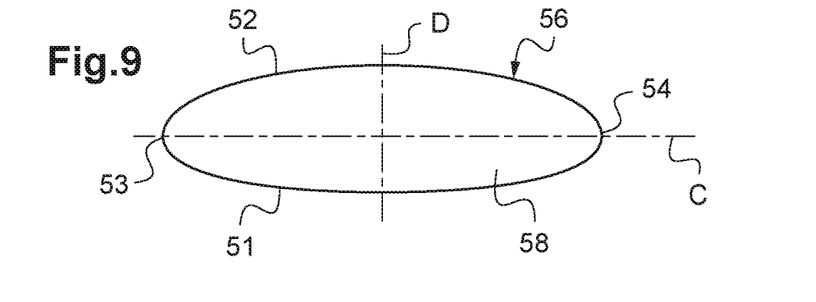
FIG. 9 is a view from beneath of an asymmetrical aerodynamic profile.

As shown in FIG. 9, in a second profile example, the streamlined profile 56 may be asymmetrical. In this configuration, the suction side 52 and the pressure side 51 are not symmetrical relative to the chord C.

Nevertheless, the profile 56 may be of the biconvex type with axial symmetry relative to a line D perpendicular to the chord C. Under such circumstances, the leading edge 53 and the trailing edge 54 are symmetrical relative to each other.

Figure 10:
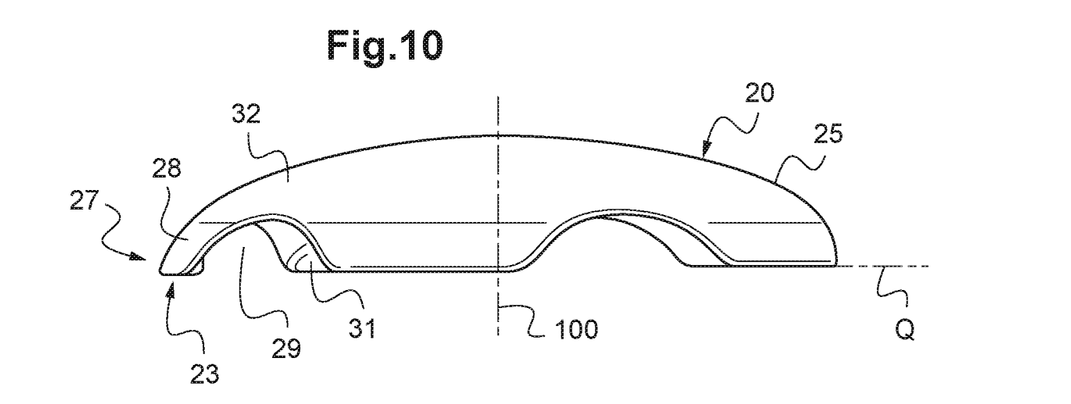
FIGS. 10 and 11 are side views of two variant caps in accordance with the invention.

As shown in FIG. 10, and in a first variant cap 25, each crenellation 28 has a bottom face 23 that is plane, being located at the periphery 27 where it joins together the inside face 31 and the outside face 32 at the free end of each crenellation 28. The various plane faces 23 then enable a plane Q to be defined that is perpendicular to the axis of rotation 100 in elevation.

Figure 11:
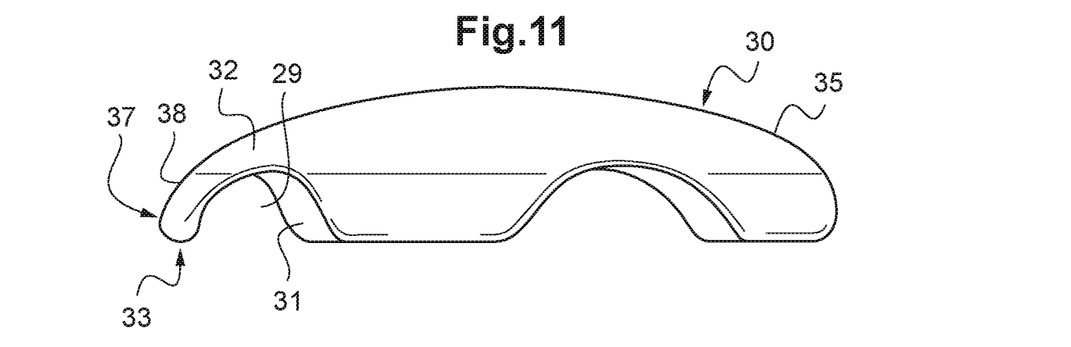

In a second variant cap 35, as shown in FIG. 11, the periphery 37 may be defined by the free ends of the crenellations having rounded faces 33 for joining together the inside and outside faces 31 and 32 of the cap 35. Together the rounded faces may lie within a toroidal shape that is concentric with the periphery 37.

Figure 12:
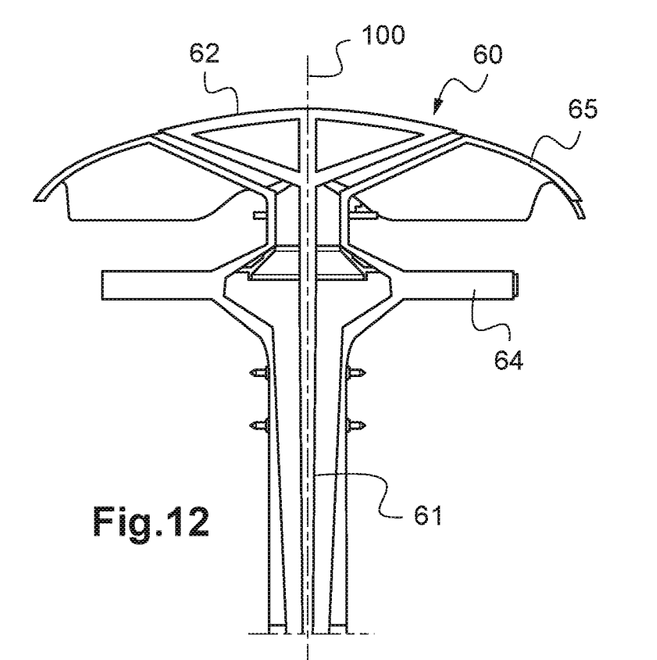
FIGS. 12 and 13 are section views showing third and fourth embodiments of heads in accordance with the invention.

As shown in FIG. 12, in a third embodiment, the head 60 may have a cap 65 secured to the rotor 64 and a plate 62 that is stationary relative to the structure of the rotorcraft. Only the cap 65 then needs to have the shape of a body of revolution in order to avoid disturbing the incident air stream while it is rotating.

The plate 62 may have various shapes and it is connected via a mast 61 to the structure of the rotorcraft 10.

Figure 13:
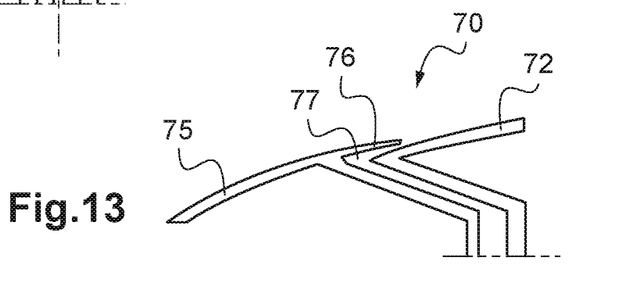

As shown in FIG. 13, in a fourth embodiment, the head 70 may also have overlap zones 76 forming a labyrinth 77 between the cap 75 that is rotatable with the rotor and the plate 72 that is secured to the structure of the rotorcraft. Such a labyrinth 77 then serves to further optimize the aerodynamics of such a head 70.

Figure 14:
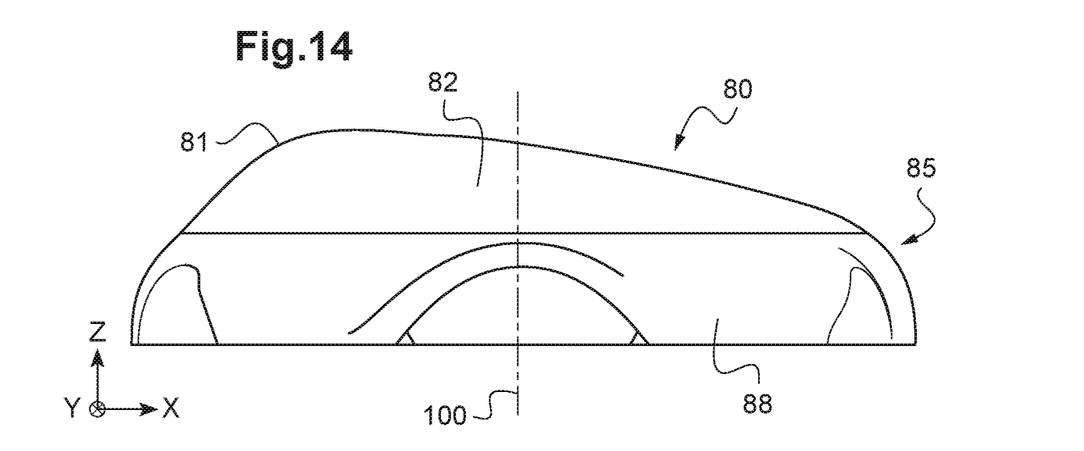
FIG. 14 is a side view of a fifth embodiment of a head in accordance with the invention.

As shown in FIG. 14, in a fifth embodiment, the head 80 has a plate 82 of a shape that is not a body of revolution. Specifically, in the XZ plane defined by the directions X and Z, the shape of the plate 82 may be profiled so as to be higher in a proximal zone 81 towards the front of the rotorcraft 10, it being recalled that the plate 82 is secured to and stationary relative to the structure of the rotorcraft.

This particular shape for the plate 82 thus corresponds to its longitudinal profile. The transverse profile of the plate 82, i.e. its side view in the YZ plane, may then be different from its longitudinal profile, e.g. retaining a shape that is substantially elliptical or circular.

As in the other embodiments, the cap 85 has a crenellated shape with crenellations 88, each presenting a streamlined profile. In contrast, unlike the plate 82, the cap 85 is in the shape of a body of revolution around the axis of rotation 100 in elevation.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A head for a rotor of a rotorcraft, the head comprising a cap extending radially from an axis of rotation in elevation towards a periphery and extending in azimuth over 360 degrees, the cap extending in thickness between an inside face that is to face a hub of the rotor and an outside face overlying the inside face, the periphery being crenellated to define a succession of crenellations and of notches, each notch allowing a blade of the rotor to perform flapping motion, wherein each of the crenellations presents a streamlined profile at least in a section plane P perpendicular to the axis of rotation in elevation, the streamlined profile presenting:
   varying thickness measured between the inside face and the outside face;
   a suction side formed by the outside face and a pressure side formed by the inside face; and
   a leading edge that is substantially rounded, having a first radius of curvature, and a trailing edge that is substantially rounded, having a second radius of curvature, wherein the streamlined profile has a chord C extending from the leading edge to the trailing edge with the suction side being arranged strictly on a first side of the chord C and the pressure side being arranged strictly on a second side of the chord C, with the second side being opposite the first side.

2. The head according to claim 1, wherein the section plane P is positioned at half-height of the notches.

3. The head according to claim 1, wherein the crenellations of the cap are identical to one another.

4. The head according to claim 1, wherein the first radius of curvature of the leading edge of the streamlined profile is equal to the second radius of curvature of the trailing edge of the streamlined profile.

5. The head according to claim 1, wherein the streamlined profile of each crenellation is elliptical.

6. The head according to claim 1, wherein the streamlined profile of each crenellation is asymmetrical.

7. The head according to claim 1, wherein the streamlined profile of each of the crenellations presents relative thickness lying in the range 10% to 30%.

8. The head according to claim 1, wherein, in the section plane P perpendicular to the axis of rotation in elevation, the chord C slopes at an angle α relative to a tangent T to a circumference defined as the intersection between the outside face and the section plane P, the angle α lying in the range −30° to +30°.

9. The head according to claim 1, wherein each of the crenellations has a plane bottom face at the periphery, the plane face extending perpendicularly relative to the axis of rotation in elevation.

10. The head according to claim 1, wherein each of the crenellations has a rounded bottom face at the periphery.

11. A rotor of a rotorcraft provided with a hub carrying a plurality of blades, wherein the rotor includes a head according to claim 1.

12. A rotorcraft, wherein the rotorcraft includes at least one rotor according to claim 11.

13. A head for a rotor of a rotorcraft, the head comprising a cap extending radially from an axis of rotation in elevation towards a periphery and extending in azimuth over 360 degrees, the cap extending in thickness between an inside face that is to face a hub of the rotor and an outside face overlying the inside face, the periphery defining a succession of crenellations and notches, each notch capable of allowing a blade of the rotor to move therein in a flapping motion, wherein each of the crenellations presents a streamlined profile in a section plane perpendicular to the axis of rotation in elevation, the streamlined profile presenting:
   a wall thickness extending between the inside face and the outside face, the wall thickness varying in azimuth along the profile;
   a suction side formed by the outside face and a pressure side formed by the inside face; and
   a leading edge that is substantially rounded, having a first radius of curvature, and a trailing edge that is substantially rounded, having a second radius of curvature, the leading edge and the trailing edge extending between and connecting the inside and outside faces such that the inside face joins directly with the outside face, wherein the streamlined profile has a chord C extending from the leading edge to the trailing edge with the suction side being arranged on a first side of the chord C and the pressure side being arranged on a second side of the chord C, with the second side being opposite the first side.

14. The head according to claim 13, wherein the section plane is positioned at half-height of the notches.

15. The head according to claim 13, wherein the crenellations of the cap are identical to one another.

16. The head according to claim 13, wherein the first radius of curvature of the leading edge of the streamlined profile of the crenellations is equal to the second radius of curvature of the trailing edge of the streamlined profile of the crenellations, and wherein the suction side is arranged strictly on the first side of the chord C and the pressure side is arranged strictly on a second side of the chord C.

17. The head according to claim 13, wherein the streamlined profile of each crenellation is elliptical.

18. The head according to claim 13, wherein the streamlined profile of each crenellation is asymmetrical.

19. The head according to claim 13, wherein each of the crenellations has a rounded bottom face at the periphery.

20. A rotorcraft comprising:
a rotor provided with a hub carrying a plurality of blades; and
a head comprising a cap extending radially from an axis of rotation in elevation towards a periphery and extending in azimuth over 360 degrees, the cap extending in thickness between an inside face that is to face a hub of the rotor and an outside face overlying the inside face, the periphery defining a succession of crenellations and notches, each notch capable of allowing a blade of the rotor to move therein in a flapping motion, wherein each of the crenellations presents a streamlined profile in a section plane perpendicular to the axis of rotation in elevation, the streamlined profile presenting:
a wall that extends between the inside face and the outside face and varies in thickness in azimuth;
a suction side formed by the outside face and a pressure side formed by the inside face; and
a leading edge that is substantially rounded, having a first radius of curvature, and a trailing edge that is substantially rounded, having a second radius of curvature, wherein the streamlined profile has a chord C extending from the leading edge to the trailing edge, and wherein the suction side is arranged strictly on a first side of the chord C and the pressure side is arranged strictly on a second side of the chord C, with the second side being opposite the first side.

* * * * *